US012597236B2

(12) United States Patent
Geng et al.

(10) Patent No.: US 12,597,236 B2
(45) Date of Patent: Apr. 7, 2026

(54) FINE-TUNING JOINT TEXT-IMAGE ENCODERS USING REPROGRAMMING

(71) Applicant: International Business Machines Corporation, Armonk, NY (US)

(72) Inventors: Andrew Geng, Madison, WI (US); Pin-Yu Chen, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 18/146,581

(22) Filed: Dec. 27, 2022

(65) Prior Publication Data

US 2024/0212327 A1      Jun. 27, 2024

(51) Int. Cl.
| | |
|---|---|
| *G06V 10/774* | (2022.01) |
| *G06F 40/284* | (2020.01) |
| *G06V 10/80* | (2022.01) |
| *G06V 20/62* | (2022.01) |

(52) U.S. Cl.
CPC .......... *G06V 10/774* (2022.01); *G06F 40/284* (2020.01); *G06V 10/806* (2022.01); *G06V 20/62* (2022.01)

(58) Field of Classification Search
CPC .... G06V 10/774; G06V 10/806; G06V 20/62; G06V 10/82; G06F 40/284
See application file for complete search history.

(56) References Cited

U.S. PATENT DOCUMENTS

| | | | |
|---|---|---|---|
| 10,824,818 B2 | 11/2020 | Peper et al. | |
| 2022/0092407 A1 | 3/2022 | Chen et al. | |

| | | | |
|---|---|---|---|
| 2022/0101494 A1* | 3/2022 | Mardani Korani | .......................... G06F 18/21347 |
| 2022/0130134 A1* | 4/2022 | Jansen | ................. G06V 10/811 |
| 2022/0171938 A1 | 6/2022 | Jalaluddin et al. | |
| 2022/0230414 A1* | 7/2022 | Noh | .......................... G06N 3/08 |

(Continued)

FOREIGN PATENT DOCUMENTS

| | | |
|---|---|---|
| CN | 110457982 A | 11/2019 |
| CN | 110852368 A | 2/2020 |

(Continued)

OTHER PUBLICATIONS

Chen, Pin-Yu. "Model Reprogramming: Resource-Efficient Cross-Domain Machine Learning." arXiv preprint arXiv:2202.10629 (2022).

(Continued)

*Primary Examiner* — Amandeep Saini
*Assistant Examiner* — Emma Rose Goebel
(74) *Attorney, Agent, or Firm* — Patterson + Sheridan, LLP

(57)                ABSTRACT

Techniques to fine-tune a joint text-image encoder via model reprogramming. The joint text-image encoder includes an image encoder and a text encoder, which are trained. An image and a caption describing the image are received. A reprogrammed image is generated based on the received image and using a first function. A reprogrammed caption is generated based on the received caption and using a second function. The image encoder and the text encoder are further trained using the reprogrammed image and the reprogrammed caption. One or more parameters for each of the first and second functions are backpropagated to produce, via transfer learning, the fine-tuned joint text-image encoder.

20 Claims, 5 Drawing Sheets

(56) References Cited

U.S. PATENT DOCUMENTS

| | | | | |
|---|---|---|---|---|
| 2023/0153606 A1* | 5/2023 | Min | | G06N 3/08 |
| | | | | 706/25 |
| 2023/0386646 A1* | 11/2023 | Tanwani | | G06V 10/806 |
| 2024/0153256 A1* | 5/2024 | Keysers | | G06V 10/778 |

FOREIGN PATENT DOCUMENTS

| | | |
|---|---|---|
| CN | 112862569 A | 5/2021 |
| CN | 112801219 B | 6/2021 |
| CN | 113449085 B | 11/2021 |
| CN | 113239924 B | 4/2022 |

OTHER PUBLICATIONS

Grace Period Disclosure—Andrew Geng, Pin-Yu Chen, "The Hidden Costs on Distributional Shifts when Fine-tuning Joint Text-Image Encoders and Redemptions", submitted to the Conference and Workshop on Neural Information Processing Systems (NeurIPS) 2022 on May 25, 2022.
Grace Period Disclosure—Andrew Geng, Pin-Yu Chen, "The Hidden Costs on Distributional Shifts when Fine-tuning Joint Text-Image Encoders and Redemptions" submitted to the Computer Vision and Pattern Recognition Conference (CVPR) 2023 on Nov. 11, 2022.

* cited by examiner

Figure 4:
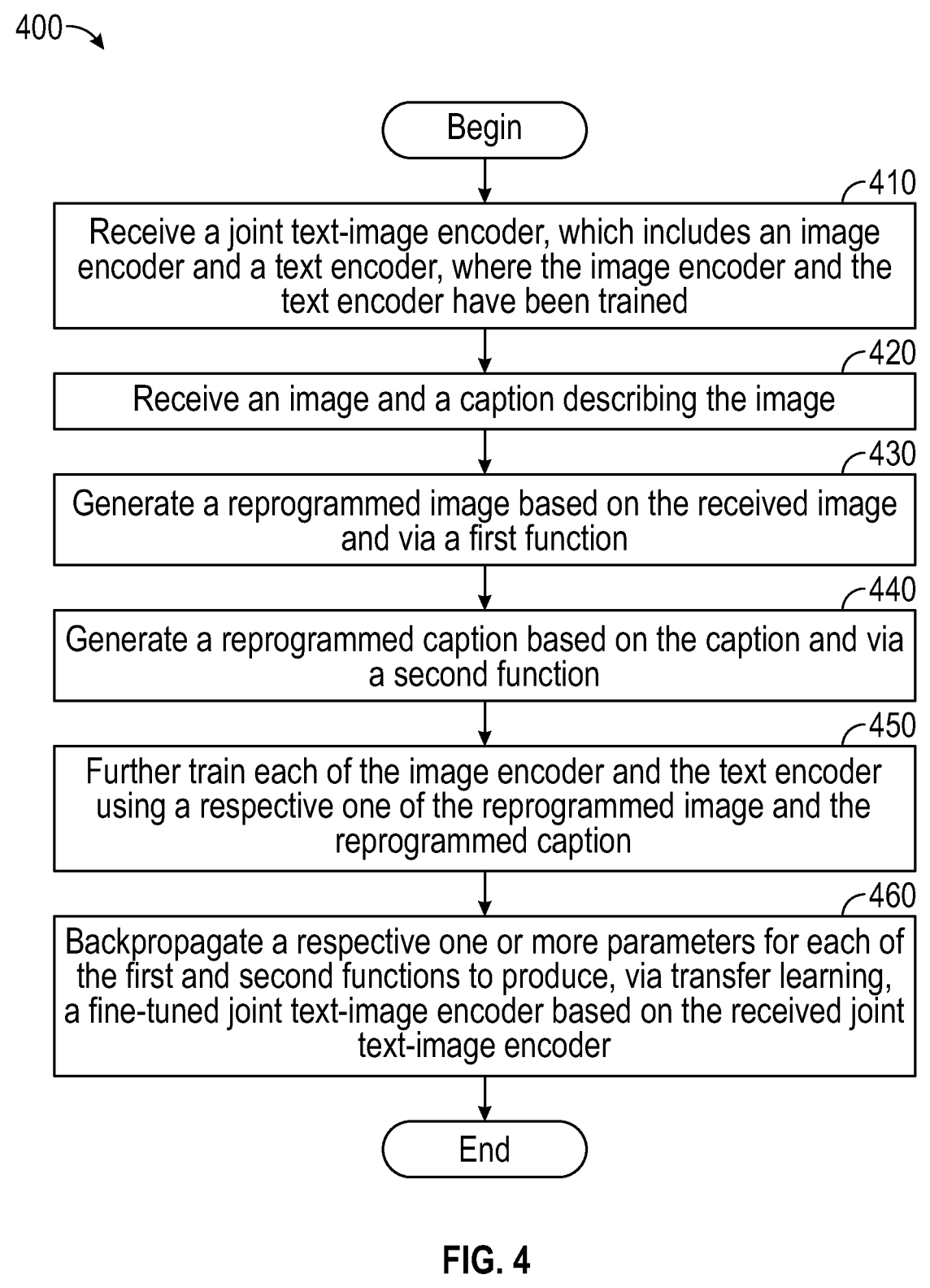

400

Begin

410

Receive a joint text-image encoder, which includes an image encoder and a text encoder, where the image encoder and the text encoder have been trained

420

Receive an image and a caption describing the image

430

Generate a reprogrammed image based on the received image and via a first function

440

Generate a reprogrammed caption based on the caption and via a second function

450

Further train each of the image encoder and the text encoder using a respective one of the reprogrammed image and the reprogrammed caption

460

Backpropagate a respective one or more parameters for each of the first and second functions to produce, via transfer learning, a fine-tuned joint text-image encoder based on the received joint text-image encoder End

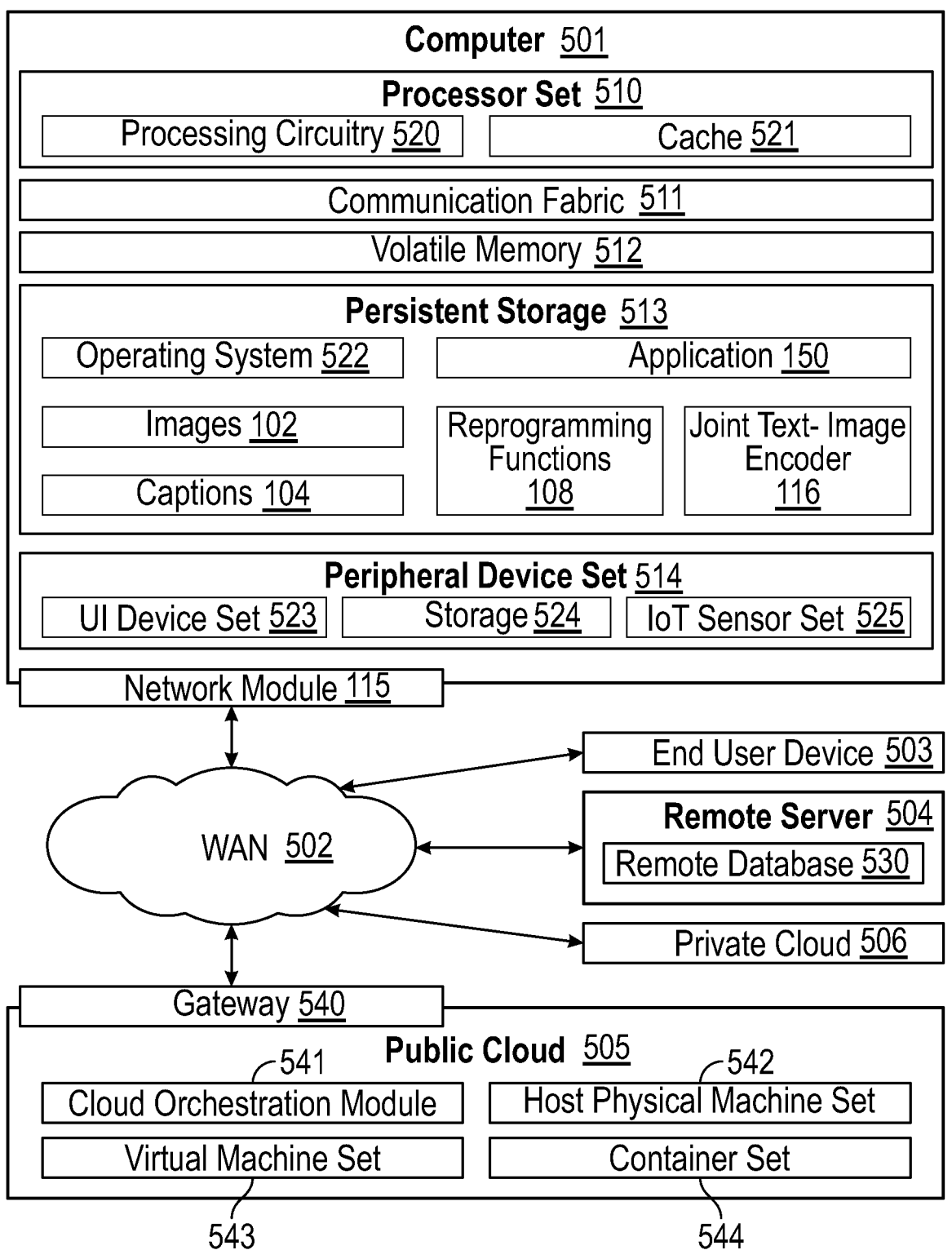

Computer 501

Processor Set 510

Processing Circuitry 520 | Cache 521

Communication Fabric 511

Volatile Memory 512

Persistent Storage 513

Operating System 522 | Application 150

Images 102 | Reprogramming Functions 108 | Joint Text- Image Encoder 116

Captions 104

Peripheral Device Set 514

UI Device Set 523 | Storage 524 | IoT Sensor Set 525

Network Module 115

End User Device 503

WAN 502

Remote Server 504

Remote Database 530

Private Cloud 506

Gateway 540

541

Public Cloud 505

542

Cloud Orchestration Module | Host Physical Machine Set

Virtual Machine Set | Container Set

FINE-TUNING JOINT TEXT-IMAGE ENCODERS USING REPROGRAMMING

The following disclosures are submitted under 35 U.S.C. 102(b)(1)(A) as having been made by the named inventors of this application:

The Hidden Costs on Distributional Shifts when Fine-tuning Joint Text-Image Encoders and Redemptions, Andrew Geng, Pin-Yu Chen, submitted to the Conference and Workshop on Neural Information Processing Systems (NeurIPS) 2022 on May 25, 2022.

The Hidden Costs on Distributional Shifts when Fine-tuning Joint Text-Image Encoders and Redemptions, Andrew Geng, Pin-Yu Chen, submitted to the Computer Vision and Pattern Recognition Conference (CVPR) 2023 on Nov. 11, 2022.

BACKGROUND

Embodiments presented in this disclosure relate to techniques for training machine learning models. More specifically, embodiments disclosed herein relate to fine-tuning joint text-image encoders using model reprogramming.

Machine learning is the scientific study of algorithms and statistical models that computer systems use to effectively perform a specific task without using explicit instructions, relying on models and inference instead, often seen as a subtype of artificial intelligence. Machine learning algorithms build a mathematical model of sample data, known as "training data," in order to make predictions or decisions without being explicitly programmed to perform the task.

As a simple example, a machine learning program may be given as training data: (i) a large set of images that show various cats; and (ii) labels that identify each of the images as showing a cat. Based on this training data, the machine learning algorithms of the machine learning program may find patterns in the image data that are taken to be indicative of an image showing a cat. The, when a new unlabeled image is received by the machine learning program, the machine learning algorithm can determine that the newly received image exhibits the patterns that are indicative of a cat image and identify the newly received image as a cat image. These patterns upon which machine learning is based may be revised over time, as additional images and/or labels are received. In this way, an image that was initially incorrectly identified as a cat image, might be subsequently correctly identified as a non-cat image.

SUMMARY

Embodiments presented in this disclosure provide a computer-implemented method, a computer program product, and a system to perform an operation to fine-tune a joint text-image encoder via model reprogramming. The operation includes receiving the joint text-image encoder, which includes an image encoder and a text encoder, which are trained. The operation also includes receiving an image and a caption describing the image. The operation also includes generating a reprogrammed image based on the received image and via a first function. The operation also includes generating a reprogrammed caption based on the caption and via a second function. The operation also includes further training each of the image encoder and the text encoder using a respective one of the reprogrammed image and the reprogrammed caption. The operation also includes back-propagating a respective one or more parameters for each of the first and second functions to produce, via transfer learning, the fine-tuned joint text-image encoder based on the received joint text-image encoder.

BRIEF DESCRIPTION OF THE DRAWINGS

FIG. 4 is a flowchart depicting a method for fine-tuning joint text-image encoders using model reprogramming, according to one embodiment presented in this disclosure.

FIG. 5 is a block diagram illustrating components of a computing environment for fine-tuning joint text-image encoders using model reprogramming, according to one embodiment presented in this disclosure.

DETAILED DESCRIPTION

Figure 1:
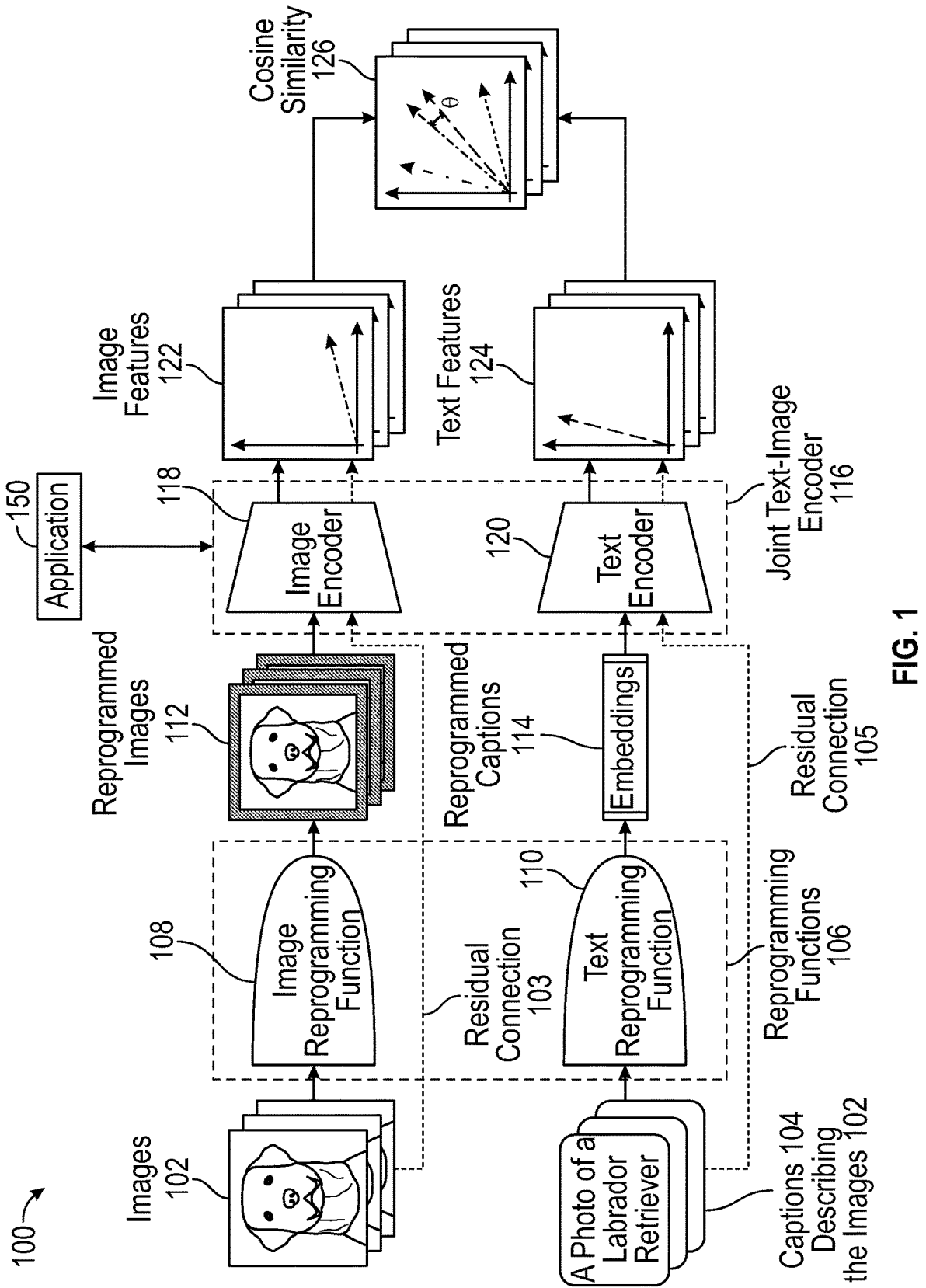
FIG. 1 is a block diagram for fine-tuning joint text-image encoders using model reprogramming, according to one embodiment presented in this disclosure.

Embodiments presented in this disclosure provide techniques for training machine learning models—more specifically, techniques for fine-tuning joint text-image encoders using model reprogramming. To explain machine learning in more detail, there are three types of approaches to training machine learning processes: supervised/semi-supervised learning, unsupervised learning, and reinforcement learning. Supervised learning algorithms create a mathematical model of a set of data that includes both the inputs and the desired outputs. The data is often referred to as training data and contains a set of training examples. Each training example has at least one input and a desired output, sometimes called a supervisory signal. With semi-supervised learning algorithms, some training examples do not include the desired output. Unsupervised learning algorithms receive a set of data that contains only input values, and identify structure in the data, like grouping or clustering of data points. The algorithms typically learn from test data that has not been labeled, classified, or categorized. Instead of reacting to feedback, unsupervised learning algorithms determine commonalities in the data and respond based on the presence or absence of such commonalities in every new segment of data. Reinforcement learning is an area of machine learning concerning how software agents should take actions in a given environment so as to maximize a notion of cumulative reward.

At least some embodiments disclosed herein provide techniques for transfer learning. In transfer learning, a model is trained, or pre-trained, with an initial set of training data. The data need not necessarily represent the input data of a task desired to be solved. The training permits the model to learn generalized features. The trained, or pre-trained, model is then fine-tuned on a subsequent set of training data that actually represents the task desired to be solved. The task is referred to as a downstream task at least in the context of transfer learning. The techniques produce a downstream model from a pre-trained model.

Depending on the embodiment, the pre-trained model can include models of arbitrarily large sizes and/or models that are trained on diverse sets of data. The produced downstream model can satisfy one or more measurement criteria pertaining to model quality and/or training efficiency. For example, the one or more measurement criteria can include model accuracy classifying subsequently received input data such as an image. Using the techniques described herein, the one or more measurement criteria can be satisfied to a higher degree than using alternative approaches in an absence of the described techniques.

For example, alternative approaches of transfer learning may include linear probing and full fine-tuning. Linear probing is characterized by fine-tuning only a classification head of a model, while full fine-tuning is characterized by fine-tuning all of the parameters of a model. A classification head refers to a set of output units tailored for a specific type of classification, where the model can have an output layer that includes a respective head for each type of classification problem. At least some alternative approaches produce joint text-image encoder models that are not trained using zero-shot learning. Zero-shot learning refers to training to predict objects of classes that were not included in a set of initial training data, thereby generalizing the zero-shot model to unseen object types. The joint text-image encoder models using such alternative approaches can exhibit performance degradation in out-of-distribution tasks.

In contrast, at least some embodiments disclosed herein use zero-shot learning techniques to produce zero-shot joint text-image encoder models. The zero-shot joint text-image encoder models can perform effectively even on out-of-distribution tasks. In-distribution generalization refers to generalizing to examples that are new but still drawn from a same distribution as a data set used for training. An example result of in-distribution generalization is an ability to classify a new breed of dog as a dog, when the data set used for training only depicts other breeds of dogs. Out-of-distribution generalization refers to generalizing to inputs drawn from a different distribution than a data set used for training. An example result of out-of-distribution generalization is an ability to classify a cow as a class representing a cow, when the data set used for training depicts different breeds of dogs.

At least some of the alternative approaches can have associated limitations. For instance, although applying transfer learning to a pre-trained text-image encoder model can improve in-domain classification accuracy, doing so can substantially degrade out-of-distribution performance of the downstream model in different types of tasks, e.g., out-of distribution generalization (domain adaptation) and out-of-distribution detection (uncertainly estimation). The degradation of out-of-distribution performance can be caused by distortions to the pre-training representations as a result of the fine-tuning performed. The pre-training representations refer to representations in the model that were learned during previous training. As another instance, alternative approaches forgo any text encoder representations and/or fine-tuning thereof. These alternative approaches instead only fine-tune the image encoder, which can result in a substantial loss in terms of an extent of semantic representation contained in the resultant downstream model. In contrast, at least some embodiments herein applies a transfer learning technique that keeps, fine-tunes, and uses both the image encoder and the text encoder.

In one embodiment, to evaluate the performance of the downstream models in out-of-distribution generalization, the techniques described herein are tuned, and the accuracy of the resultant downstream models are compared to two distinct but related datasets, $D_{in}$ and $D_{out}$. The $D_{in}$ set is the in-distribution dataset to which the pre-trained model is to be tuned on. The separate, out-of-distribution dataset $D_{out}$ is a covariate-shifted (domain-shifted), out-of-distribution dataset. This dataset contains samples that have the same semantic meanings as the in-distribution dataset $D_{in}$, but that are presented in different forms. For example, these forms can include sketched, origami, and other versions of the in-distribution classes. The goal of a good transfer-learning technique, in a setting of out-of-distribution generalization, is for there to be high accuracy across both $D_{in}$ and $D_{out}$. Being able to attain high measures of accuracy across both datasets can be important, because a model that is intelligent and robust should be agnostic to covariate shifts of a sample, at least in some cases.

In some embodiments, out-of-distribution detection, on the other hand, can be formulated as a binary classification problem. Such a formulation can include one where, given some classifier $f^{\sim}$, tasked on the in-distribution dataset $D_{in}$, the objective is to design a function estimator that can be defined as given by Equation 1:

$$h(\hat{x}) = \text{in}, \quad \text{if } S(\hat{x}) \geq \gamma \\ \text{out}, \quad \text{if } S(\hat{x}) < \gamma,$$

where $h(\hat{x})$ can determine whether a sample $\hat{x}$ is in-distribution $D_{in}$ or out-of-distribution $Q_{out}$. In this context, $Q_{out}$ can be considered as a semantically shifted distribution and is not to be confused with $D_{out}$, which can be considered as a covariate-shifted distribution. In the setting of out-of-distribution detection, the goal is to detect semantically shifted (concept-shifted) samples. For example, if the in-distribution dataset encapsulates samples of {"cats", "dogs" }, then the goal of the detector h, given a "car" sample $\hat{x}$, is to detect that the $\hat{x}$ sample does not belong to the in-distribution set $\hat{x} \in /D_{in}$ or, equivalently, that the sample is out-of-distribution $\hat{x} \in Q_{out}$.

In one embodiment, to evaluate out-of-distribution detection, a maximum softmax probability (msp) detector $h_{msp}$ is applied, where $h_{msp}$ measures the confidence of the classifier $f^{\sim}$ towards a given input $\hat{x}$. The goal here for a good transfer learning method, is to produce a downstream model $f^{\sim}$ that is not overconfident on semantically shifted out-of-distribution samples, while maintaining confidence when predicting on in-distribution samples. This goal may not necessarily be apparent in some cases, because it can be desired to have a safe and robust model that does not—at least not overconfidently—find a semantically dissociated out-of-distribution sample as being indistinguishable from an in-distribution sample, at least in some cases.

FIG. 1 is a block diagram 100 for fine-tuning joint text-image encoders using model reprogramming, according to one embodiment. During model reprogramming, an image and a corresponding caption, from a same pair, are each independently passed through a respective reprogramming function before being passed through a respective one of the image and text encoders. A loss is then computed based on a cosine similarity of the features extracted by the image and text encoders, and parameters of each reprogramming function are backpropagated. Depending on the embodiment, the backpropagated parameters can be updated and/or optimized as learnable parameters of the respective reprogramming function. Further, at least in some embodiments, some or all of the operations of model reprogramming can be performed by an application 150. The image can be taken from images 102, and the caption can be taken from the captions 104, which describe the images 102. Each reprogramming function can be selected from the reprogramming functions 106.

As shown, the reprogramming functions 106 include an image reprogramming function 108 for reprogramming the images 102 to create reprogrammed images 112. The reprogramming functions 106 further include a text reprogramming function 110 for reprogramming the captions 104 to create reprogrammed captions 114. The image and text encoders are of a joint text-image encoder 116. The joint text-image encoder includes an image encoder 118 for encoding the reprogrammed images 118 by extracting image features 122 from the reprogrammed images 112. The joint text-image encoder 116 also includes a text encoder 120 for encoding the reprogrammed captions 114 by extracting text features 124 from the reprogrammed captions 114. The loss is computed based on a cosine similarity 126 of the extracted features. This use of model reprogramming can be referred to as a model reprogramming technique called reprogrammer. At least in some cases, any parameters of the encoders remain fixed or unchanged at least when encoding the reprogrammed images and reprogrammed captions.

Further, in some embodiments, a residual connection is optionally added from each input to the corresponding encoder. These residual connections are represented as a residual connection 103 from the images 102 to the image encoder 108 and a residual connection 105 from the captions 104 to the text encoder 120. Doing so can cause both the input and the reprogrammed outputs to be fused during cosine-similarity matching at inference time. Adding these residual connections can further facilitate retention of pre-training, semantic representations in the downstream model, thereby further improving accuracy of the downstream model in out-of-distribution generalization and detection tasks, at least in some cases. When the model reprogramming technique is adapted to include these residual connections, the model reprogramming technique can be referred to as residual reprogrammer. On the other hand, when the model reprogramming technique is adapted to exclude these residual connections, the model reprograming technique can be referred to as non-residual reprogrammer.

Accordingly, at least some embodiments provide a transfer learning technique for joint text-image encoder models based on model reprogramming techniques. In one embodiment, model reprogramming refers to a resource efficient, cross-domain framework used to re-purpose models for different task-specific scenarios. The framework of model reprogramming can be deemed as drawing inspiration from adversarial reprogramming, according to one embodiment. The goal of model reprogramming is to re-use and re-align the data representation, from an existing model, for a separate task without fundamental changes to parameters of the model. Model reprogramming approaches can be shown to be effective in a variety of settings, including both white-box and black-box settings. In some cases, white-box settings are settings in involving models that exhibit a threshold measure of transparency in how the model arrives at each answer; such models are referred to as white-box models. In contrast, in some cases, black-box settings are settings involving models that exhibit a threshold measure of lack of transparency in how the model arrives at each answer; such models are referred to as black-box models.

At least in some cases, model reprogramming approaches operate by training an image/audio reprogramming function to optimally transform continuous input data, such that the output of the model can be used to perform some other desired task. One particular reprogramming approach is directed to sequence classification models and uses a context-based vocabulary remapping function. The model-reprogramming techniques disclosed herein, however, can constitute a pioneering application of the model reprogramming method to the domain of joint text-image pre-trained encoders in a multi-modal setting, according to one embodiment.

As such, the transfer learning technique described herein can be less intrusive, in terms of distorting the pre-training representations in the model, than alternative fine-tuning approaches, thereby maintaining the pre-training representations to a greater extent, at least in some cases. The technique trains reprogramming functions to align the in-domain image and text encoder representations to a greater extent than absent such training of the reprogramming functions. At least in some cases, the reprogramming functions can be trained concurrently or simultaneously. This technique can produce downstream models that outperform alternative approaches to applying transfer learning to pre-trained models, at least in out-of-distribution tasks, including out-of-distribution generalization and out-of-distribution detection.

In some embodiments, the generalization and detection capabilities of a downstream model on out-of-distribution samples can be taken into account when evaluating performance of the downstream model. In this regard, the downstream model is transferred from a pre-trained model to a downstream task that can include out-of-distribution samples. Some approaches to fine-tuning can have an intrusive effect on representations. This can impose hidden costs on performance of a resultant downstream model on out-of-distribution generalization and detection tasks. In some embodiments, these costs can be reduced using the model reprogramming technique described herein.

In one embodiment, downstream models produced using the model reprogramming technique can exhibit greater performance characteristics at least in some contexts such as out-of-distribution generalization (e.g., when covariate-shifted out-of-distribution samples are involved). Additionally or alternatively, downstream models produced using the model reprogramming technique can promote greater measures of separability between in-distribution samples in some contexts such as out-of-distribution detection (e.g., when semantically shifted out-of-distribution samples are involved). As such, the present disclosure describes hidden costs on distributional shifts when fine-tuning joint text-image encoders and provides techniques for reducing the hidden costs.

In some embodiments, as pre-trained models are adopted with progressively greater frequency in solving complex downstream tasks, there can be a growing need to ensure the safety and robustness of these downstream models. Oftentimes in the real-world, downstream models will encounter samples that are shifted, in various degrees, away from the expected in-distribution dataset.

For samples that are covariate-shifted (non-semantically shifted) from the in-distribution dataset, the robustness of the downstream model can be characterized by performance of the downstream model in out-of-distribution generalization, according to one embodiment. The criterion by which the robustness is characterized can include a degree of accuracy with which the downstream model maintains across all covariate-shifted out-of-distribution samples; a robust model should maintain accuracy that meets a threshold measure of reliably high accuracy.

As for samples that are concept-shifted (semantically shifted) from the in-distribution dataset, the safety of the downstream model can be characterized by performance of the downstream model in out-of-distribution detection, according to one embodiment. The criterion by which the safety is characterized can include a degree to which the downstream model does not compromise detection of semantically shifted out-of-distribution samples.

In one embodiment, pre-trained models, learned using a diverse dataset of an arbitrarily large size, can be a good candidate for building machine learning models that can be efficiently transferred to downstream tasks. At least in some embodiments include a Contrastive Language-Image Pre-training (CLIP) technique to produce a model. At least in some cases, the model can be an image-text multimodal model. An image-text multimodal model refers to a machine learning model that is trained to learn connections between image and text data, according to one embodiment. CLIP is a model that is pre-trained, using natural-language supervision, on a large, 400-million set of image-caption pairs obtained from the web. Specifically, given a set of image-caption pairs $D=\{(X_1, T_1), \ldots (X_n, T_n)\}$, image-text multimodal models train an image-encoder f and a text-encoder g over the dataset D such that the cosine similarity between the features $f(x_k)$ and $h(t_k)$ is maximized with respect to each pair k.

Put another way, CLIP trains a model using pairs as training data, where each pair includes an image and text corresponding to the image; the text is also referred to as a caption for the image, according to one embodiment. Given a set of image-caption pairs, CLIP trains an image encoder and a text encoder over a set of input data such that a cosine similarity between features extracted by the image encoder and features extracted by the text encoder is maximized with respect to each pair, where the features are captured and represented as embeddings.

As such, CLIP jointly trains the image encoder and the text encoder to predict correct pairings of the pairs in the training data, at least in some embodiments. More specifically, at least in some embodiments, CLIP learns an embedding space by maximizing a cosine similarity of embeddings of the image and the caption of correct pairings of the training data while also minimizing a cosine similarity of embeddings of the image and the caption of incorrect pairings of the training data. The embedding space is also referred to as a multimodal embedding space, given the training data including both images and text. Accordingly, CLIP uses natural-language supervision to train a model to learn image representations.

There can be many hurdles to improving performance of downstream models in out-of-distribution generalization and detection tasks, ranging from difficulties in encapsulating covariant shifts to overconfidence in predictions based on semantically shifted samples. One technique that can address these hurdles at least to some extent is text-image supervised pre-trained models of an arbitrary large size, such as CLIP, as described earlier.

In some embodiments, the model reprogramming techniques disclosed herein provide a reprogramming approach based on two different modalities to reprogram both the image encoder and the text encoder concurrently. The model reprogramming techniques can be attained by adopting and altering certain aspects of other reprogramming-based approaches to transfer learning, where the other reprogramming-based approaches are not applied to joint text-image encoder models. As such, and as previously stated, the model reprogramming techniques can constitute a pioneering application of reprogramming-based approaches to joint text-image encoder models. The model reprogramming techniques can reprogram a CLIP pre-trained model to not only be competitive with linear-probing techniques on downstream in-distribution tasks but also improve performance in both out-of-distribution generalization tasks and in out-of-distribution detection tasks.

As described earlier in this disclosure, alternative approaches to fine-tuning can degrade both out-of-distribution generalization and detection performances in resultant downstream models. In particular, linear probing discards the representations learned in the text encoder, replacing it instead with a newly parameterized classification head. On the other hand, full fine-tuning can distort the parameters of the full model to fit the in-distribution task. The model reprogramming techniques disclosed herein can be less intrusive and impose fewer or no changes to the pre-trained text and image encoders at least in some cases. As such, the model programming techniques can facilitate maintaining, to a greater degree, the representations learned by the text and image encoders from their pre-training processes. Further, by reprogramming the image encoder on in-distribution samples, the covariate-shifted out-of-distribution samples can be aligned to a greater degree to the in-distribution space during inference time, thereby improving subsequent out-of-distribution generalization, at least in some cases.

Figures 2A, 2B:
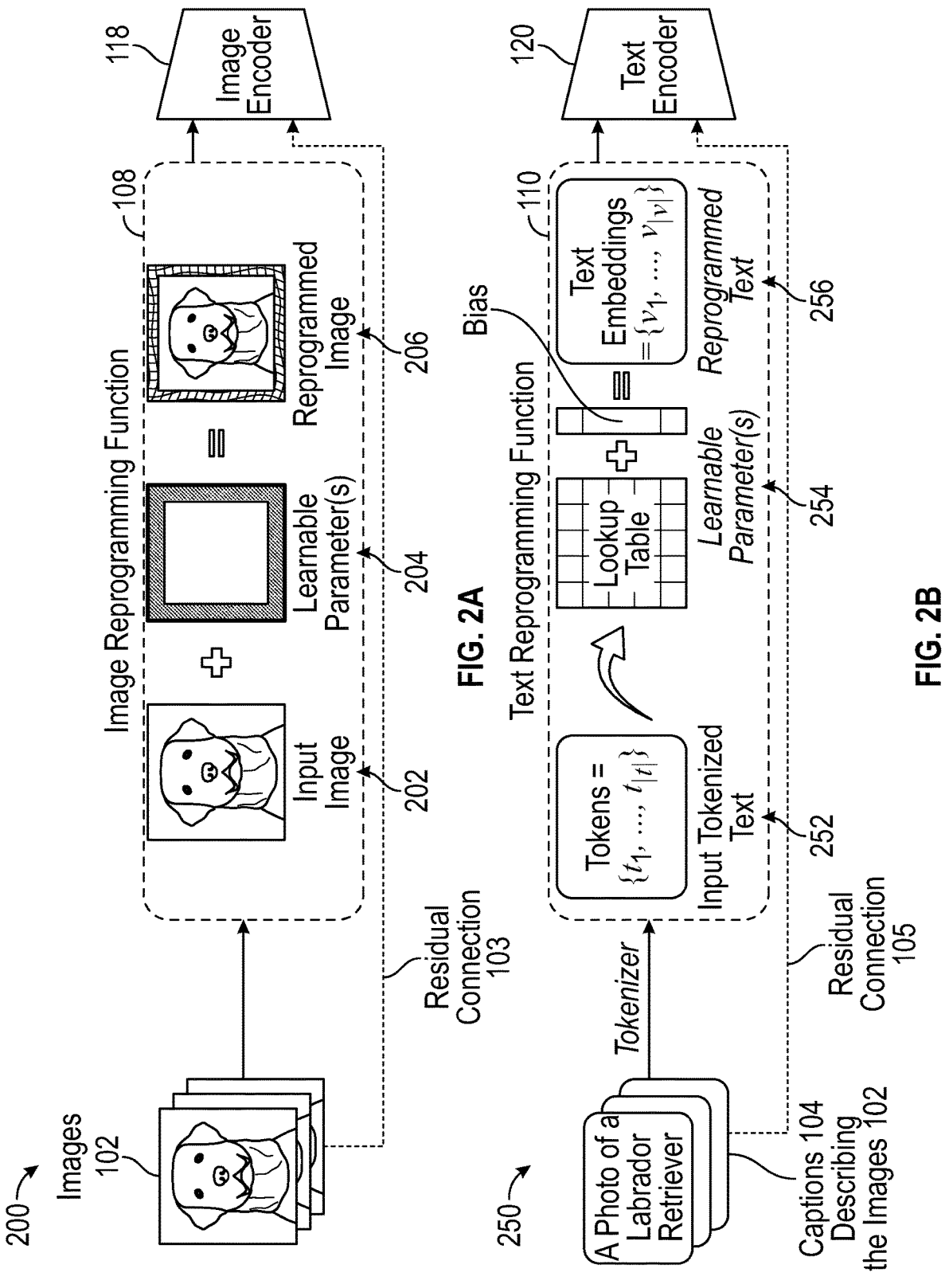
FIGS. 2A-2B are block diagrams respectively depicting image and text reprogramming functions used in fine-tuning joint text-image encoders, according to one embodiment presented in this disclosure.

FIGS. 2A-2B are block diagrams respectively depicting image and text reprogramming functions 108, 110 used in fine-tuning joint text-image encoders, according to one embodiment. As used herein, an image reprogramming function is also referred to as an image-reprogramming function or an image reprogrammer, while a text reprogramming function is also referred to as a text-reprogramming function or a text reprogrammer. Depending on the embodiment, each of the image and text reprogramming functions 108, 110 can be a respective module of an application, such as the application 150, or a respective, standalone application other than application 150.

Referring to FIG. 2A, the image reprogramming function 108 is shown in block diagram 200. The image reprogramming function 108 takes, as input, an input image 202 from images 102 and generates a reprogrammed image 206 based on one or more learnable parameters 204. The reprogrammed image 206, rather than the input image 102, is then sent to the image encoder 118 for feature extraction. In some embodiments, the residual connection 103 from the images 102 to the image encoder 118 can optionally be included. The image reprogramming function 108 can be further described as follows, given a CLIP image encoder $f: I \rightarrow R^{b \times k}$ where b is the input-image batch-size, and where $k=512$ is the CLIP feature-size. In some embodiments, to apply reprogramming, a reprogramming function $\psi$ can be defined that includes a trainable function for input transformation and applicable to images. This trainable function is referred to as an adversarial function or adversarial program. The reprogramming function $\psi$ is applied to the input image pre-forward pass through the CLIP image encoder f. The reprogramming function $\psi$ is not specific to any singular input image but consistently applied to all images, at least in some embodiments.

In one embodiment, the reprogramming function, $\psi$, is defined as given by Equation 2:

$$\psi(X) = U(X) + \tanh(W \odot M)$$

where U represents an image up-sampling then zero-padding function, $W \in R^{d \times d \times 3}$ represents the image reprogrammer parameters that is to be learned, d represents a size in terms of input width and height of the CLIP, $\odot$ represents the Hadamard product, and M represents a binary masking matrix. In particular, the binary masking matrix M is defined as having a respective element having a value of zero, for each position where the original image is desired to be implanted, at least in some cases. Additionally or alternatively, the binary masking matrix M is further defined as having a respective element having a value of one, for each position chosen to be reprogrammed, in some cases.

In some embodiments, the image reprogrammer can up-sample images to the input size of the pre-trained model. However, due to restrictions that can exist in open-sourced pre-trained CLIP models, the image reprogrammer up-sampling can be limited to being 3×224×224 dimensions or less, in some cases. Additionally or alternatively, as part of the reprogramming function $\psi$, one or more of the size of the up-sampling/padding function U, and the binary masking matrix M are tunable hyperparameters. Hyperparameters refer to parameters whose values are used to control a learning process in machine learning, in contrast to other parameters, such as weights of nodes in machine learning models, whose values are derived via training, at least in some embodiments. Further, the image reprogrammer also operates as an input-perturbation function that increases in-distribution softmax scores, according to one embodiment. As such, at least in some cases, the image reprogrammer can consistently improve separability between in-distribution and out-of-distribution samples, thereby improving performance at least in terms of accuracy in out-of-distribution detection tasks.

Referring to FIG. 2B, the text reprogramming function 110 is shown in block diagram 250. The text reprogramming function 110 takes, as input, tokenized text 252 generated based on the captions 104 describing the images 102. The tokenized text 252 can be generated using a tokenizer. The text reprogramming function 110 generates reprogrammed text 256 based on the tokenized text 252 and learnable parameters 254. In a particular embodiment, the one or more learnable parameters 254 include multiple learnable parameters, while the one or more learnable parameters 204 consist of a single learnable parameter. The reprogrammed text 256, rather than the tokenized text 252 or any of the captions 104, is then sent to the text encoder 120 for feature extraction. In some embodiments, the residual connection 105 from the captions 104 to the text encoder 120 can optionally be included.

In one embodiment, the text reprogramming function 110 can be further described as follows, given the CLIP text encoder g: $S \rightarrow R^{b \times k}$, where b is the input-text batch-size, and where k=512 is the CLIP feature-size. Further, the text input s is defined as a sequence of tokens s={$s_1, \ldots, s_{|s|}$ }, where $s_i$ is the vocabulary index of the i-th token in the vocabulary list $V_S$. At least in some cases, the default CLIP text tokenizer with a context length of seventy-seven, where the context length can be measured in tokens. In some cases, the text input caption can be estimated through $s_i$="a photo of a {$c_i$}", where $c_i$ is a class label.

At least in some embodiments, the adversarial function described earlier is used in applying reprogramming to the text input. To this end, the text reprogramming function $\Phi_\theta$ is defined to be a look-up embedding on the tokens {$s_i$}, where $\Phi_\theta$ can be parameterized by the learnable embedding tensor $\theta$. Specifically, $\theta \in R^{|V\_S| \times d}$ is defined with a default vocabulary size is $V_S$=49408, which is an expected vocabulary size for the CLIP text-encoder; Vs is represented as V_S. Further, as with reprogramming functions in general, the text reprogramming function $\Phi_\theta$ is not specific to any singular text input but is consistently applied to all text inputs. As an example, given a text Labrador Retriever label, the text reprogrammer first tokenizes the string s="a photo of a Labrador Retriever" into tokens $t_s$. Next, the text reprogrammer passes $t_s$ into the $\Phi_\theta$ function to embed the tokens into a vector $v_s$. Then, the vector $v_s$ is passed through the CLIP text encoder g to obtain the reprogrammed text features, according to one embodiment.

Figure 3:
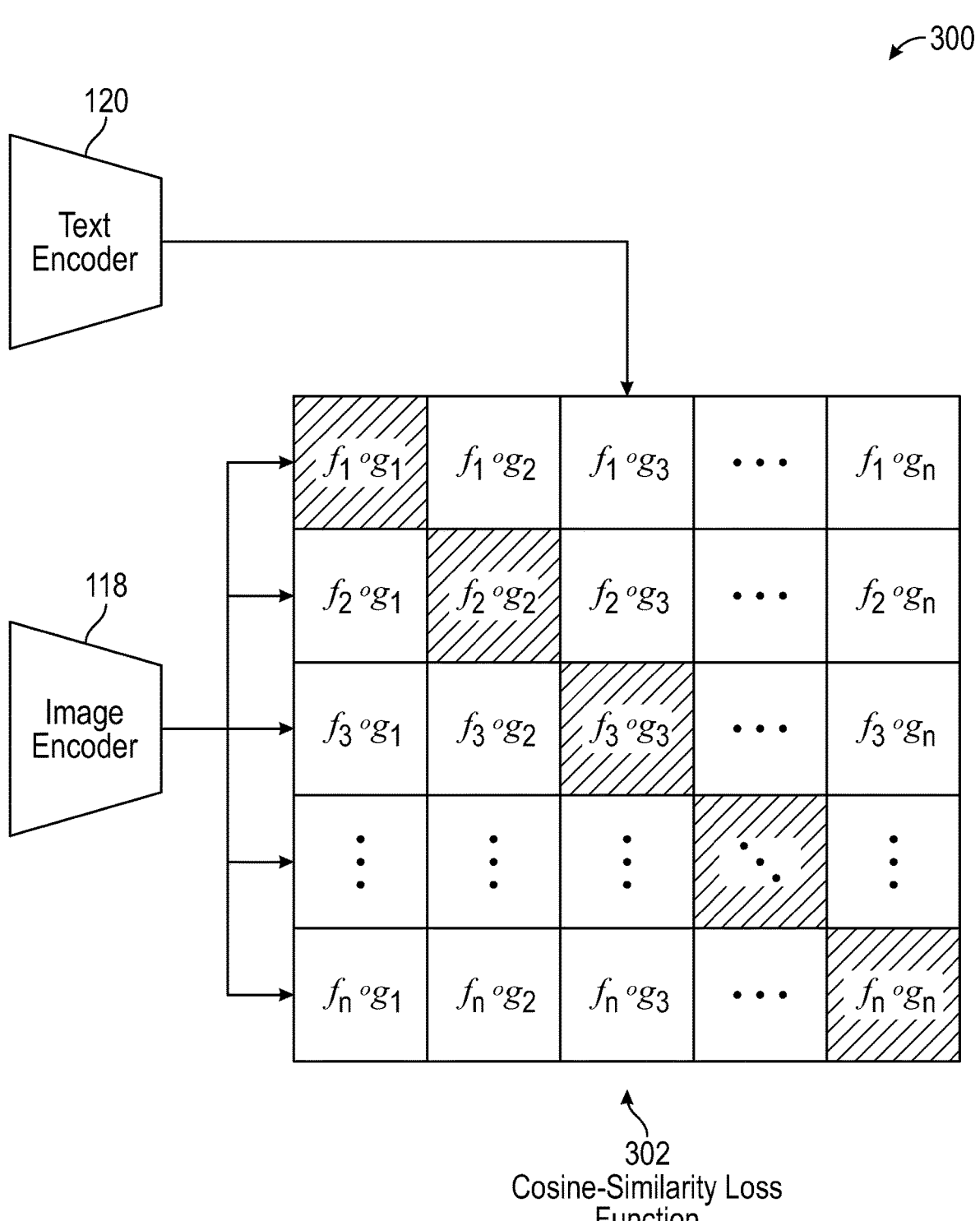
FIG. 3 is a block diagram depicting a loss function used in fine-tuning joint text-image encoders, according to one embodiment presented in this disclosure.

FIG. 3 is a block diagram 300 depicting a loss function used in fine-tuning joint text-image encoders, according to one embodiment. Although the loss function is shown and described as a cosine-similarity loss function 302, the type of loss function used can vary and be tailored to suit the needs of a particular case. The cosine-similarity loss function computes a loss based on the respective outputs of each of the image encoder 118 and the text encoder 120. The output of the image encoder 118 includes features extracted by the image encoder 118 from a reprogrammed image. The output of the text encoder includes features extracted by the text encoder 120 from reprogrammed text, according to one embodiment.

As such, in some embodiments, the loss can be computed based on a cosine similarity of the respective features extracted by each of the image and text encoders, and parameters of each reprogramming function are backpropagated. Further, the backpropagated parameters can be updated and/or optimized. In this way, the image encoder 118 and the text encoder 120 can be trained such that a cosine similarity between features extracted by the image encoder 118 and features extracted by the text encoder 120 is maximized with respect to each pair of input data, in some embodiments.

In one embodiment, the loss function is part of a model reprogrammer, which can be the application 150 or a component thereof, dependent on the embodiment. In a particular embodiment, the model reprogrammer is a CLIP-model reprogrammer. To train the image and text reprogramming functions $\psi$ and $\Phi_\theta$, a training objective can be defined as given by Equation 3:

$$W*, \theta* = \underset{W, \theta}{\mathrm{argmax}}(\mathrm{similarity}(f(\psi w(x)), g(\Phi_\theta(s))))$$

where (x, s) represents an image-and-caption pair obtained from the training set $D_{in}$, where f and g represent the CLIP image and text encoders, respectively, where "similarity" represents the cosine-similarity function, and where W, $\theta$ are the learnable parameters encapsulating the reprogramming functions $\psi_W$, $\Phi_\theta$.

At least in some embodiments, rather than optimizing directly for cosine similarity, the techniques disclosed herein apply an optimization schema based on a loss function that the CLIP model was pre-trained with. The optimization schema involves using an optimizer to train the parameters for reprogramming. One such example of the optimizer includes Adaptive Moment Estimation (Adam), which refers to a replacement optimization algorithm for stochastic gradient descent for training machine learning models. In some embodiments, the loss function is a symmetric, cross-entropy loss function. Cross entropy loss measures a difference between a discovered probability distribution of a model and a predicted distribution of the model, at least in some cases. Symmetric loss functions produce the same penalty when underpredicting versus overpredicting to a same absolute extent; in contrast, an asymmetric loss function applies different penalties to the different directions of loss, in some cases.

In one embodiment, after tuning the reprogrammer parameters W and θ, classification is performed during inference time, given an input image $\hat{x}$ with m classes to choose from C={$c_1$, . . . , $c_m$}, similar to that of zero-shot CLIP. In particular, a prediction y can be generated as given by Equation 4:

$$y = \text{argmax}(\text{similarity}(f(\psi_W * (\hat{x})), g(\Phi_{\theta*}(s_i)))$$

where $s_i$ represents class-wise captions such that $s_i$="a photo of a {$c_i$}", and where $\psi_{W*}$ and $\Phi_{\theta*}$ represent the learned reprogramming functions, which are parameterized by W* and θ*, respectively.

At least in some embodiments, implementing the reprogrammer based on dual reprogramming functions can reduce or eliminate any need of curating a label-map at least in some cases. The curating can include manual and/or automatic curation, depending on the embodiment. Curing a label-map refers to a model-reprogramming approach in which outputs of a model are remapped to more closely fit a desired task. By using the dual-reprogramming functions and the image-caption pairs using the techniques described herein, the label-map can be embedded and tuned as part of the reprogrammer at least in some cases.

As described earlier, to further facilitate retention of pre-training, semantic representations in the downstream model, a residual connection can optionally be added from each input to the corresponding encoder, according to one embodiment. Doing so effectively fuses the inputs with the reprogrammed outputs. The inputs can be referred to as pre-training representations, while the reprogrammed outputs can be referred to as reprogrammed representations. The residual connections can function as an inference-time regularizer for the image and text reprogramming functions at least in some cases.

In one embodiment, the reprogramming functions when the residual connections are included can be further described as follows, given a tuned, reprogrammer model with parameters W, θ, b and given an input image $\hat{x}$ with m class labels C={$c_1$, . . . , $c_m$}. These reprogramming functions can be defined as given by Equations 5 and 6, respectively:

$$F(\hat{x}) = (1 - \alpha)f(\psi_W * (\hat{x})) + \alpha f(\hat{x})$$

$$G(s_i) = (1 - \alpha)g(\Phi_{\theta*,b*}(s_i)) + \alpha g(s_i)$$

where $\psi_{W*}$ and $\Phi_{\theta*,b*}$ represent the learned reprogramming functions parameterized by W*, θ*, and b*, respectively. Subsequently, during inference time, classification in residual reprogrammer can be performed as given by Equation 7:

$$y = \text{argmax}(\text{similarity}(F(\hat{x}), G(s_i)))$$

where $s_i$ represents class-wise captions such as, for instance, "a photo of a {$c_i$}".

FIG. 4 is a flowchart depicting a method 400 for fine-tuning joint text-image encoders using model reprogramming, according to one embodiment. The method 400 can be performed by the application 150 of FIG. 1. As shown, the method 400 begins at step 410, where the application 150 receives a joint text-image encoder. The joint text-image encoder includes an image encoder and a text encoder, and the image encoder and the text encoder have been trained. At step 420, the application 150 receives an image and a caption describing the image. At step 430, the application 150 generates a reprogrammed image based on the received image and via a first function. At step 440, the application 150 generates a reprogrammed caption based on the caption and via a second function.

At step 450, the application 150 further trains each of the image encoder and the text encoder using a respective one of the reprogrammed image and the reprogrammed caption, according to one embodiment. At step 460, the application 150 backpropagates a respective one or more parameters for each of the first and second functions. Doing so produces, via transfer learning, a fine-tuned joint text-image encoder based on the received joint text-image encoder. At least in some embodiments, each backpropagated parameter can be updated and/or optimized as a learnable parameter for the respective function. After the step 460, the method 400 terminates.

Accordingly, embodiments presented in this disclosure provide techniques for fine-tuning and transferring pre-trained models to downstream tasks, the techniques including model reprogramming. The model reprogramming, when compared with full fine-tuning or linear probing, can improve the safety and robustness of resultant downstream models on semantically and covariate-shifted out-of-distribution samples, while maintaining comparable measures of performance for in-distribution tasks. For instance, the model reprogramming has shown to, at least in some cases when compared to linear probing, result in downstream models that increase a measure of average accuracy by 1.2% in a diverse set of out-of-distribution generalization tasks, while reducing a false-positive rate by 6.96% in a diverse set of out-of-distribution detection tasks based on the Canadian Institute For Advanced Research (CIFAR) datasets.

Advantageously, by using the techniques disclosed herein, transfer learning involving pre-trained machine learning models can be improved and can benefit a range of fields. For instance, given that the number of machine learning models that rely on classification, improving the transfer learning in terms of aspects such as safety and robustness can be critical to any system ranging from consumer and business applications to autonomous vehicles and medical imaging, to name but a few examples.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 5 is a block diagram illustrating components of a computing environment for fine-tuning joint text-image encoders using model reprogramming, according to one embodiment. Computing environment 500 contains an example of an environment for the execution of at least some of the computer code involved in performing the inventive methods, such as block 150, which represents the application configured to fine-tuning joint text-image encoders using model reprogramming, according to one embodiment. In addition to block 150, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including the operating system 522, the images 102, the captions 104, the application 150, the reprogramming functions 108, and the joint text-image encoder 116), peripheral device set 514 (including user interface (UI) device set 523, storage 524, and Internet of Things (IOT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 150 in persistent storage 513.

COMMUNICATION FABRIC 511 is the signal conduction path that allows the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, volatile memory 512 is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface-type operating systems that employ a kernel. The code included in block 150 typically includes at least some of the computer code involved in performing the inventive methods, including fine-tuning joint text-image encoders using model reprogramming. To that end, the application 150 uses one of the reprogramming functions 108 to generate reprogrammed images from the images 102. Next, the application 150 uses another one of the reprogramming functions 108 to generate reprogrammed captions from the captions 104. The application 150 then further trains each of the image and text encoders of the joint text-image encoder 116 using a respective one of the reprogrammed images and captions. Subsequently, the application 150 backpropagates a respective one or more parameters for each reprogrammed image and reprogrammed caption. Doing so produces, via transfer learning, a fine-tuned joint text-image encoder based on the joint text-image encoder 116.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
   receiving a joint text-image encoder, which comprises an image encoder and a text encoder, wherein the image encoder and the text encoder have been trained;
   receiving an image and a caption describing the image;
   generating a reprogrammed image based on the received image and via a first trainable image reprogramming function of a plurality of reprogramming functions, wherein the reprogrammed image is applied to the image encoder for extracting reprogrammed image features;
   generating a reprogrammed caption based on the received caption and via a second trainable text reprogramming function of the plurality of reprogramming functions, wherein the reprogrammed caption is applied to the text encoder for extracting reprogrammed text features;
   responsive to generating the reprogrammed image and caption, further training each of the image encoder and the text encoder by one or more computer processors using a respective one of the reprogrammed image and the reprogrammed caption; and
   backpropagating a respective one or more parameters for each of the first trainable image reprogramming function and the second trainable text reprogramming function to produce, via transfer learning, a fine-tuned joint text-image encoder based on the received joint text-image encoder, second trainable image reprogramming function" should read "wherein each of the respective one or more parameters comprises a learnable parameter that enables updating the respective first trainable image reprogramming function and second trainable text reprogramming function.

2. The computer-implemented method of claim 1, wherein further training the image encoder and the text encoder comprises determining a loss based on a similarity between reprogrammed image features of the reprogrammed image and reprogrammed text features of the reprogrammed caption, and wherein each of the learnable parameters are updated by based on the loss.

3. The computer-implemented method of claim 2, wherein the similarity comprises a measure of cosine similarity.

4. The computer-implemented method of claim 1, further comprising applying the fine-tuned joint text-image encoder to a task.

5. The computer-implemented method of claim 4, wherein the task is selected from an out-of-distribution generalization task and an out-of-distribution detection task.

6. The computer-implemented method of claim 1, wherein the received joint text-image encoder comprises a Contrastive Language-Image Pre-Training model.

7. The computer-implemented method of claim 1, further comprising:
   generating a tokenized caption based on the received caption, wherein the tokenized caption is generated via a tokenizer, and wherein generating the reprogrammed caption based on the caption comprises generating the reprogrammed caption based on the tokenized caption.

8. The computer-implemented method of claim 7, wherein further training the image encoder and the text encoder comprises determining a loss based on a similarity between reprogrammed image features of the reprogrammed image and reprogrammed text features of the reprogrammed caption, wherein the similarity comprises a measure of cosine similarity.

9. The computer-implemented method of claim 8, further comprising applying the fine-tuned joint text-image encoder to a task, wherein the task is selected from an out-of-distribution generalization task and an out-of-distribution detection task.

10. The computer-implemented method of claim 9, wherein the received joint text-image encoder comprises a Contrastive Language-Image Pre-Training model.

11. A computer program product comprising:
  a computer-readable storage medium having computer-readable program code embodied therewith, the computer-readable program code executable by one or more computer processors to perform an operation comprising:
    receiving a joint text-image encoder, which comprises an image encoder and a text encoder, wherein the image encoder and the text encoder have been trained;
    receiving an image and a caption describing the image;
    generating a reprogrammed image based on the received image and via a first trainable image reprogramming function of a plurality of reprogramming functions, wherein the reprogrammed image is applied to the image encoder for extracting reprogrammed image features;
    generating a reprogrammed caption based on the received caption and via a second trainable text reprogramming function of the plurality of reprogramming functions, wherein the reprogrammed caption is applied to the text encoder for extracting reprogrammed text features;
    responsive to generating the reprogrammed image and caption, further training each of the image encoder and the text encoder using a respective one of the reprogrammed image and the reprogrammed caption; and
    backpropagating a respective one or more parameters for each of the first trainable image reprogramming function and the second trainable text reprogramming function to produce, via transfer learning, a fine-tuned joint text-image encoder based on the received joint text-image encoder, second trainable image reprogramming function" should read "wherein each of the respective one or more parameters comprises a learnable parameter that enables updating the respective first trainable image reprogramming function and second trainable text reprogramming function.

12. The computer program product of claim 11, wherein further training the image encoder and the text encoder comprises determining a loss based on a similarity between reprogrammed image features of the reprogrammed image and reprogrammed text features of the reprogrammed caption, and wherein each of the learnable parameters are updated by based on the loss.

13. The computer program product of claim 12, wherein the similarity comprises a measure of cosine similarity.

14. The computer program product of claim 11, the operation further comprising applying the fine-tuned joint text-image encoder to a task.

15. The computer program product of claim 11, wherein the received joint text-image encoder comprises a Contrastive Language-Image Pre-Training model.

16. A system comprising:
  one or more computer processors; and
  a memory containing a program executable by the one or more computer processors to perform an operation comprising:
    receiving a joint text-image encoder, which comprises an image encoder and a text encoder, wherein the image encoder and the text encoder have been trained;
    receiving an image and a caption describing the image;
    generating a reprogrammed image based on the received image and via a first trainable image reprogramming function of a plurality of reprogramming functions, wherein the reprogrammed image is applied to the image encoder for extracting reprogrammed image features;
    generating a reprogrammed caption based on the received caption and via a second trainable text reprogramming function of the plurality of reprogramming functions, wherein the reprogrammed caption is applied to the text encoder for extracting reprogrammed text features;
    responsive to generating the reprogrammed image and caption, further training each of the image encoder and the text encoder using a respective one of the reprogrammed image and the reprogrammed caption; and
    backpropagating a respective one or more parameters for each of the first trainable image reprogramming function and the second trainable text reprogramming function to produce, via transfer learning, a fine-tuned joint text-image encoder based on the received joint text-image encoder, second trainable image reprogramming function" should read "wherein each of the respective one or more parameters comprises a learnable parameter that enables updating the respective first trainable image reprogramming function and second trainable text reprogramming function.

17. The system of claim 16, wherein further training the image encoder and the text encoder comprises determining a loss based on a similarity between reprogrammed image features of the reprogrammed image and reprogrammed text features of the reprogrammed caption, and wherein each of the learnable parameters are updated by based on the loss.

18. The system of claim 17, wherein the similarity comprises a measure of cosine similarity.

19. The system of claim 16, the operation further comprising applying the fine-tuned joint text-image encoder to a task.

20. The system of claim 16, wherein the received joint text-image encoder comprises a Contrastive Language-Image Pre-Training model.

* * * * *